(12) United States Patent
Forostoski

(10) Patent No.: US 11,142,489 B2
(45) Date of Patent: Oct. 12, 2021

(54) LUBRICATED AGRICULTURAL MIXTURE

(71) Applicant: Michael F. Forostoski, Idalia, CO (US)

(72) Inventor: Michael F. Forostoski, Idalia, CO (US)

( * ) Notice: Subject to any disclaimer, the term of this patent is extended or adjusted under 35 U.S.C. 154(b) by 15 days.

(21) Appl. No.: 16/742,297

(22) Filed: Jan. 14, 2020

(65) Prior Publication Data

US 2020/0223763 A1 Jul. 16, 2020

Related U.S. Application Data

(60) Provisional application No. 62/792,054, filed on Jan. 14, 2019.

(51) Int. Cl.

| | |
|---|---|
| *C05B 7/00* | (2006.01) |
| *C05C 9/00* | (2006.01) |
| *C05D 1/00* | (2006.01) |
| *C05D 9/00* | (2006.01) |
| *C05D 9/02* | (2006.01) |
| *C05B 17/00* | (2006.01) |
| *C05C 11/00* | (2006.01) |
| *C05G 3/40* | (2020.01) |
| *C05G 5/14* | (2020.01) |
| *C05G 1/00* | (2006.01) |

(52) U.S. Cl.
CPC .................. *C05G 3/44* (2020.02); *C05B 7/00* (2013.01); *C05B 17/00* (2013.01); *C05C 9/00* (2013.01); *C05C 11/00* (2013.01); *C05D 1/00* (2013.01); *C05D 9/00* (2013.01); *C05D 9/02* (2013.01); *C05G 1/00* (2013.01); *C05G 5/14* (2020.02)

(58) Field of Classification Search
None
See application file for complete search history.

(56) References Cited

U.S. PATENT DOCUMENTS

| | | | |
|---|---|---|---|
| 4,055,974 A | 11/1977 | Jackson, Jr. | |
| 5,772,721 A * | 6/1998 | Kazemzadeh | B29C 48/345 71/11 |
| 9,988,318 B2 * | 6/2018 | Schrader | C05F 11/00 |
| 2013/0123103 A1 * | 5/2013 | Anderson | C09K 17/40 504/102 |
| 2014/0230504 A1 * | 8/2014 | Finlayson | C05F 11/08 71/6 |
| 2015/0128672 A1 * | 5/2015 | Shearer | C05G 3/70 71/24 |
| 2017/0283335 A1 * | 10/2017 | Rainey | C05D 3/02 |
| 2019/0185390 A1 * | 6/2019 | Shirley, Jr. | C05B 7/00 |
| 2020/0140352 A1 * | 5/2020 | Beaudoin Nadeau | C05F 11/08 |

FOREIGN PATENT DOCUMENTS

WO    WO 2018149421 A1 *   8/2018   .............. C05D 1/00

* cited by examiner

*Primary Examiner* — Wayne A Langel
(74) *Attorney, Agent, or Firm* — Leyendecker & Lemire, LLC

(57) ABSTRACT

A lubricated agricultural mixture and method(s) of use thereof is described. Embodiments of the lubricated agricultural mixture can include a carbon source, a fertilizer, a binder, and a hydrogel. The lubricated agricultural mixture can be formed into tablets, granules, and wafers. The different forms of the lubricated agricultural mixture can be implemented in various situations. For instance, the table form can be distributed via machinery such that the carbon source acts as a lubricant for the machinery to minimize wear on the machinery.

20 Claims, No Drawings

LUBRICATED AGRICULTURAL MIXTURE

CROSS-REFERENCE TO RELATED APPLICATION

This application claims the benefit of U.S. Provisional Application No. 62/792,054, filed Jan. 14, 2019.

BACKGROUND

U.S. Pat. No. 4,055,974 discloses a fertilizer tablet that is made by compressing a substantially uniform mixture of granular fertilizer source materials and particles of a water-swellable hydrophilic organic polymer which has the ability to reversibly absorb and desorb water and aqueous solutions. The fertilizer tablet is cured by a resin, such as urea formaldehyde resin. The fertilizer tablet may have an inert filler, such as wood flour. Once exposed to moisture, the hydrophilic polymeric gel will absorb water, disintegrate the tablet, thus making the fertilizer more available to plant roots, and then provide moisture content to the soil for the plant. However, the hydrophilic polymeric gel does not absorb the fertilizer. More importantly, the disclosed hydrophilic polymeric gel degrades when interacting with a salt-based fertilizer.

Critical limiting factors present themselves with this design and operation such as (i) application of the product post-planting, (ii) the inability of the aforementioned polymer to absorb fertilizer, (iii) the low efficiency of re-moisturizing soil by desorbing water from a swelled polymer, (iv) the use of fillers that provide no benefit to the plant, and (v) the curing of the tablet by a resin.

Currently available fertilizer tablets include many disadvantages in addition to the previously mentioned limitations. For instance, applying the product post-planting for some large-scale agricultural producers proves cost ineffective due to fuel consumption of farm equipment and the possible absence of critical nutrients during the very early stages of plant development. The inability for the polymer to absorb dissolved fertilizer hampers the tablet's ability to prevent leaching of fertilizers. Re-moisturizing the soil by desorbing water is inefficient. The use of fillers that provide no benefit to the soil, such as wood flour, forces an agricultural producer to pay for a product that does nothing for his/her crop. Further, curing the tablet with a resin adds yet another cost to manufacturing that is passed on to the agricultural producer for no benefit to the plant.

A tablet that can be applied during planting is needed. The tablet would be targeted and penetrated by an early root system seeking water and nutrients. This creates a situation where the roots penetrate the components of the tablet and absorb the water and dissolved nutrients. This more efficient system can be naturally re-charged during rainfall or irrigation, and during subsequent fertilizer applications. Of note, a hydrogel that does not degrade when interacting with salt-fertilizers is needed.

DETAILED DESCRIPTION

Embodiments of the present invention include a lubricated agricultural mixture and method(s) of use thereof. The lubricated agricultural mixture can be in a tablet, granule, or wafer form and be configured to provide nutrients to a plant while implementing a machine-friendly mixture of materials to minimize wear on farming equipment. Typically, different forms of the lubricated agricultural mixture can be manufactured via one or more methods. For instance, tablets can be formed via tablet presses and the granule form can be manufactured via a dry compaction granulation process.

In one embodiment, the lubricated agricultural mixture can include, but is not limited to, one or more granulated fertilizers, an anhydrous hydrogel, carbon, and a binder. A fertilizer may also be included in the mixture. When the binder breaks down, the anhydrous hydrogel can absorb both water and the fertilizer providing a source of hydration and nutrition to a plant located proximate the lubricated agricultural mixture. Of note, the carbon can be implemented to provide lubrication and to absorb micronutrients for use by a plant. Typically, the carbon can be in a form that disperses when exposed to water. In one instance, the carbon can be in graphite form. For example, a fine flake graphite can be implemented. In another instance, the carbon can be biochar and/or bone char. In yet another instance, a combination of graphite, bone char, and biochar can be implemented. In one embodiment, the binder can be starch. It is to be appreciated that other materials may be implemented as the binder. In some instances, a binder can be selected depending on the final form of the lubricated agricultural mixture. For instance, microcrystalline cellulose can be used for lubricated agricultural tablets and corn starch can be used for lubricated agricultural granules.

In one embodiment, the lubricated agricultural mixture can be a non-toxic biodegradable tablet that can provide substantial water and fertilizer retention capabilities for later use by a plant. The tablet can be configured to break down and allow the included hydrogel to absorb water and nutrients from the fertilizer. Once the tablet breaks down, roots of a plant may penetrate the hydrogel to retrieve water and nutrients. Embodiments of the tablet can include materials that may benefit plant growth and sustainment. In one embodiment, the tablet can be pressed to a density whereby the need for any curing compound can be non-existent, crumbling/shattering effects may be negated, and the dissolution of fertilizers and, summarily, access to the stored water, may be greatly increased.

In one embodiment, the lubricated agricultural tablet may include, but is not limited to, a compressed mixture of an anhydrous hydrogel, carbon, and a binder. In one instance, the carbon can be granulated natural flake graphite with high carbon content. Of note, natural flake graphite is an agriculturally accepted dry lubricant for extending component life in large scale farm machinery. As can be appreciated, the graphite can be included to help prevent tool binding during application of the tablets with large-scale field crops. Similar to the previously mentioned embodiment, when the binder is broken down by water, the anhydrous hydrogel can absorb water and any nutrients in the water.

Typically, embodiments of the lubricated agricultural tablet can be compressed into the shape of a tablet or a similarly shaped pellet on a conventional tablet press. Since the lubricated agricultural tablet is configured to dissolve when coming into contact with water, the lubricated agricultural tablets can be packaged in a substantially waterproof package so that the tablet will not be exposed to water or moist air before being deposited into soil or the like. Similarly, other forms of the lubricated agricultural mixture can be packaged in a substantially waterproof package.

In another embodiment, the lubricated agricultural tablet can be manufactured by a dry compaction granulation process. The dry compaction granulation process can be implemented to make granules of the lubricated agricultural mixture.

In a typical implementation, when the lubricated agricultural mixture (e.g., in a tablet, granule, and/or wafer form)

is placed in soil at an appropriate distance from a seed based on fertilizer used, the anhydrous hydrogel may absorb water and swell if the soil is moist, or if dry, the anhydrous hydrogel will swell during a natural or scheduled irrigation. The irrigation or moisture in the soil can cause dispersion of the graphite, dissolution of the fertilizer (if implemented), and absorption of the water (and fertilizer) by the hydrogel. This may provide the benefits of storing the fertilizer and water in place for the roots, enabling ease of access for the roots by eliminating the hardness of the dense mixture, and preventing leaching of the beneficial components.

The hydrogel may include, but is not limited to, sodium carboxymethyl cellulose, potassium polyacrylate, sodium polyacrylate, oligooxyethylene methacrylate, superabsorbent hydrogel polymers, and other hydrogels and water insoluble hydrophilic polymers. In one example preferred embodiment, the hydrogel can be sodium carboxymethyl cellulose. Of note, a semi-synthetic hydrogel may provide better resistance to degradation when interacting with a salt-based fertilizer. Typically, a hydrogel that may be resistant to degradation by salt-based fertilizers can be implemented.

The fertilizer may include, but is not limited to, monoammonium phosphate (MAP), diammonium phosphate (DAP), and urea. It is to be appreciated that other forms and various mixtures of fertilizer that include potassium, nitrogen, and phosphorus mixtures can be implemented. Further, fertilizers that include micronutrients including zinc, boron, and various forms of sulphur may be implemented. Of note, micronutrients may be implemented based on the type of agricultural product being farmed.

The binder can include, but is not limited to, microcrystalline cellulose and starch. It is to be appreciated that other materials may be implemented as the binder. Typically, a binder that will dissolve or disintegrate when coming into contact with water can be implemented.

The lubricated agricultural mixture may include trace amounts of sulfur and/or zinc. It is to be appreciated that other trace amounts of different elements may be included.

In one example embodiment, the lubricated agricultural mixture may include a composition of:
9%-60% hydrogel
20%-80% fertilizer
10%-15% carbon
1%-10% binder In another example embodiment, the lubricated agricultural mixture may include a composition of:
10%-60% hydrogel
30%-75% carbon
1%-15% binder The lubricated agricultural mixture can disintegrate into graphite particles and swollen gel particles when water is absorbed by the hydrogel. This may result in the hydrogel absorbing water and the graphite retaining micronutrients already in soil and fertilizer where the mixture is placed. The hydrogel can absorb water and fertilizer with subsequent irrigation and application of liquid fertilizer. As can be appreciated, roots of a plant penetrating the hydrogel may have access to both water and nutrients from the fertilizer when needed.

In one embodiment, the lubricated agricultural mixture can be manufactured as granules via a dry compaction granulation process. By implementing a dry compaction granulation process, the process can create granules that are a different form factor than tablets. The granules can contain similar components to what may be in the tablets. However, the dry compaction granulation process can allow for a less-flowable binder. For example, corn starch is an excellent binder, but does not work well in a tablet press because the corn starch does not flow well. Further, the lubricated agricultural mixture can withstand degradation by salt-based fertilizers that currently plagues available fertilizer granules.

In some embodiments, the lubricated agricultural mixture can include an addition of humates, biochar, and/or bone char. The biochar and the bone char can be implemented as carbon sources or in addition to the graphite flake. Biochar and bone char are rich in nutrients and carbon, and can act as sponges for beneficial microbials. The chars can act as a soil builder and help with cleaning up the soil as well, similar to the function of activated charcoal. Humates can promote nutrient uptake and management for a crop.

In some embodiments, the lubricated agricultural mixture can include an addition of dried compost and inoculant powder to the dry compaction granulation process. The dry compost may be peat. The addition of compost and an inoculant to the mixture can help spur development of microbials and fungi. A microbial inoculant can include, but is not limited to, rhizobacterial inoculants and fungal inoculants. The microbial and fungi can aid in better root growth and health in a rhizosphere of a crop. In one example, the fungal inoculant may be in powder form and be mycorrhizae fungi powder.

In one example embodiment, the lubricated agricultural mixture may include a composition of:
10%-60% hydrogel
10%-15% carbon
10%-15% biochar and/or bone char
10%-15% binder
10%-80% fertilizer
5%-10% humate
5%-80% dry compost
1%-10% microbial inoculant Of note, the biochar and/or bone char may be implemented as a portion of the carbon. Typically, a form of graphite can be implemented to act as a lubricant and also help retain nutrients in addition to the biochar and/or bone char. It is to be appreciated that other char products can be implemented. In instances where a tablet is to be formed, a 1%-5% flow agent can be included to help with the tablet pressing process.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

Percentages given, unless otherwise noted, are by weight.

ALTERNATIVE EMBODIMENTS AND VARIATIONS

The various embodiments and variations thereof, illustrated in the accompanying FIGURES and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A lubricated agricultural mixture in solid form comprising:
   9%-60% anhydrous hydrogel;
   20%-80% fertilizer;
   10%-15% carbon, the carbon including flake graphite; and
   1%-10% binder.

2. The lubricated agricultural mixture of claim 1, wherein the anhydrous hydrogel is selected from the group consisting of sodium carboxymethyl cellulose, potassium polyacrylate, sodium polyacrylate, and oligooxyethylene methacrylate.

3. The lubricated agricultural mixture of claim 1, wherein the fertilizer is selected from the group consisting of monoammonium phosphate (MAP), diammonium phosphate (DAP), urea, and mixtures thereof.

4. The lubricated agricultural mixture of claim 1, wherein the fertilizer is selected from the group consisting of potassium, nitrogen, phosphorus, zinc, sulphur, and mixtures thereof.

5. The lubricated agricultural mixture of claim 1, wherein the flake graphite is granulated natural flake graphite.

6. The lubricated agricultural mixture of claim 1, wherein the carbon further includes bone char.

7. The lubricated agricultural mixture of claim 1, wherein the carbon further includes biochar.

8. The lubricated agricultural mixture of claim 1, wherein the carbon acts as a lubricant.

9. The lubricated agricultural mixture of claim 1, wherein a tablet of the mixture is manufactured from a tablet press.

10. The lubricated agricultural mixture of claim 9, wherein the binder is microcrystalline cellulose.

11. The lubricated agricultural mixture of claim 1, wherein a granule of the mixture is manufactured from a dry compaction granulation process.

12. The lubricated agricultural mixture of claim 11, wherein the binder is starch.

13. The lubricated agricultural mixture of claim 1, wherein the mixture further comprises:
    1%-5% humate.

14. The lubricated agricultural mixture of claim 1, wherein the mixture further comprises:
    1%-5% microbial inoculant.

15. The lubricated agricultural mixture of claim 14, wherein the microbial inoculant is selected from the group consisting of Rhizobacterial inoculants and fungal inoculants.

16. A lubricated agricultural tablet comprising:
    9%-60% anhydrous hydrogel;
    20%-80% fertilizer;
    10%-15% carbon, the carbon including flake graphite; and
    1%-10% microcrystalline cellulose.

17. The lubricated agricultural tablet of claim 16, wherein the anhydrous hydrogel is selected from the group consisting of sodium carboxymethyl cellulose, potassium polyacrylate, sodium polyacrylate, and oligooxyethylene methacrylate.

18. The lubricated agricultural tablet of claim 16, wherein the fertilizer is selected from the group consisting of monoammonium phosphate (MAP), diammonium phosphate (DAP), urea, and mixtures thereof.

19. A lubricated agricultural granule comprising:
    9%-60% anhydrous hydrogel;
    20%-80% fertilizer;
    10%-15% carbon, the carbon including flake graphite; and
    1%-10% corn starch.

20. The lubricated agricultural granule of claim 19, wherein the carbon further includes one or more from the group consisting bone char and biochar.

* * * * *